Nov. 9, 1943.  A. R. BROSI  2,333,699
MANUFACTURE OF RUBBER THREADS
Filed Aug. 29, 1942  2 Sheets-Sheet 1
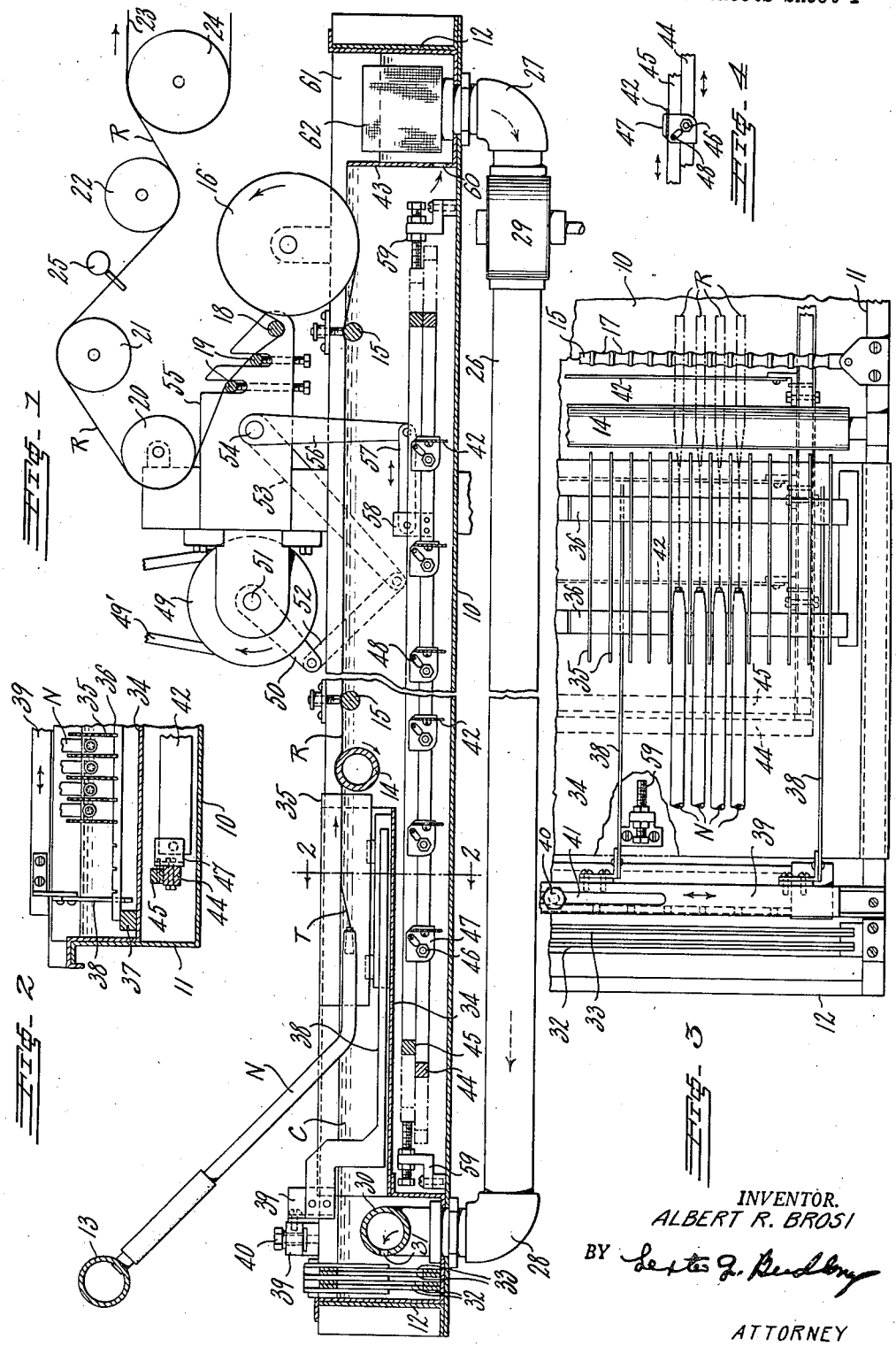
INVENTOR.
ALBERT R. BROSI
BY
ATTORNEY Nov. 9, 1943.                A. R. BROSI                     2,333,699
                     MANUFACTURE OF RUBBER THREADS
                         Filed Aug. 29, 1942          2 Sheets-Sheet 2
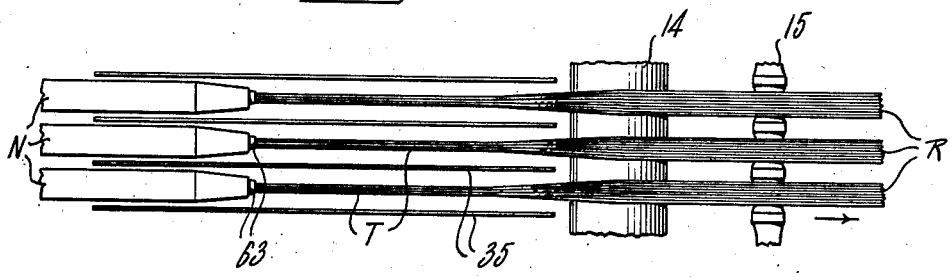
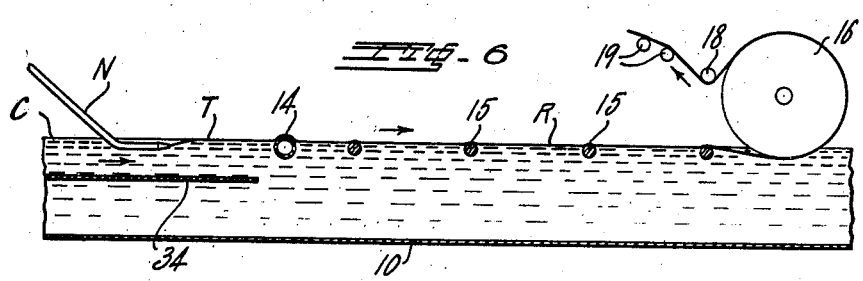
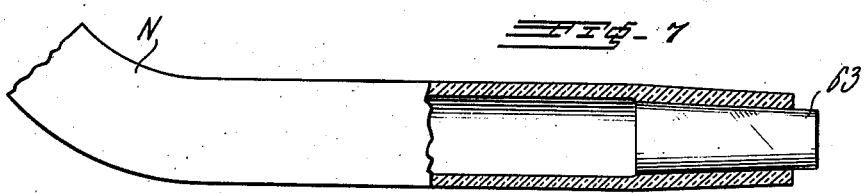
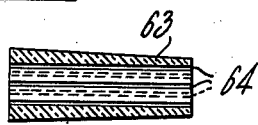
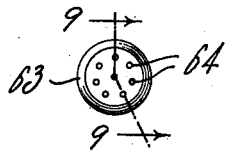
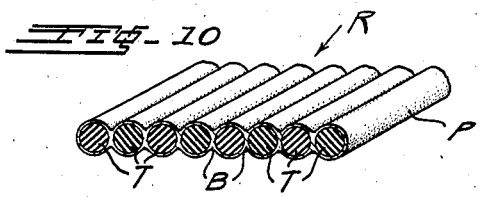
INVENTOR.
ALBERT R. BROSI
BY Lester J. Budley
ATTORNEY Patented Nov. 9, 1943

2,333,699

UNITED STATES PATENT OFFICE 2,333,699

MANUFACTURE OF RUBBER THREADS

Albert R. Brosi, Providence, R. I., assignor to United States Rubber Company, New York, N. Y., a corporation of New Jersey Application August 29, 1942, Serial No. 456,645

15 Claims. (Cl. 18—54)

This invention relates to the manufacture of rubber threads and more particularly to the manufacture of extruded latex threads in the form of a ribbon, whereby the output of a thread extruding, drying and vulcanizing machine may be greatly increased.

Heretofore large quantities of rubber thread have been manufactured by extruding latex through a number of laterally spaced individual nozzles into a coagulant, and advancing the coagulated rubber threads thus formed through the coagulating liquid out of contact with each other and onto a conveyor belt that carries the threads through a drying and vulcanizing chamber.

It has been necessary heretofore to prevent the finer size freshly formed tacky threads, say threads less than .02" in diameter, from coming in contact with each other in the coagulant and upon the conveyor belt, for if these finer threads touch each other while they are being vulcanized, it is practically impossible later to separate them without breaking the threads into short lengths. This practice of keeping the latex threads out of contact with each other until they are vulcanized made it necessary to place them on the vulcanizing belt in spaced relation to each other, so that only a few threads could be deposited on the belt for each inch of the width of the belt.

The present invention contemplates a ribbon formed of separable latex threads, and method whereby the number of threads per inch that may be deposited upon a drying and vulcanizing belt may be greatly increased, to thereby increase the capacity of a drying and vulcanizing machine to a number of times the capacity of a drying and vulcanizing machine of the same size used heretofore. This increase in the capacity of a machine for making extruded latex threads and vulcanizing such thread is secured, in accordance with the present invention, by forming the threads into ribbons and then depositing the ribbons on the conveyor belt.

Each ribbon may be made up of any convenient number of threads, and these ribbons rather than the individual threads are deposited upon the conveyor belt in spaced relation to each other. By thus avoiding the necessity of spacing the individual threads apart on the conveyor belt the capacity of the belt is greatly increased.

If however, as above mentioned, the freshly extruded fine threads are permitted to come into direct contact with each oher any time before they are vulcanized it will be difficult if not impossible to separate the threads after they have been vulcanized. Therefore, if these freshly extruded threads are to be formed into a ribbon to facilitate vulcanization and then separated, it is essential that steps be taken to prevent these threads from coming into firm rubber to rubber contact with each other either in the coagulant or upon the vulcanizing belt.

Therefore, a highly important feature of the present invention resides in the method whereby fine freshly extruded latex threads may be disposed side by side and bonded together to form a ribbon to facilitate vulcanization and may be later separated after vulcanization.

It has been proposed heretofore to bring freshly formed latex threads into side by side relation in the form of a ribbon and to blow talc between the threads immediately before they are brought together so as to reduce the strength of the bond between the threads. It is found however that if the tacky condition of the freshly formed fine threads is relied upon to retain them in ribbon formation while they are being vulcanized, then it is extremely difficult if not impossible to separate the threads after vulcanization.

This difficulty is overcome in accordance with the present invention by introducing a tack-reducing material directly into the coagulating bath, and which tack-reducing material is capable of forming a film-like coating around each individual thread as soon as it is extruded so as to prevent the threads from adhering together when they contact each other, and which material also serves when dried to form a coherent cake or layer between the threads that is capable of holding them in ribbon formation during vulcanization and of permitting the threads to be readily separated after vulcanization.

It is found that a tack-preventing powder such as talc may be introduced directly into the coagulant without appreciably disturbing the coagulation of the threads therein, but it is also found that the introduction of talc powder alone into the coagulant is not sufficient to perform satisfactorily the dual function above mentioned of keeping the threads from coming into firm surface to surface contact with each other and of forming an adhesive cake or bond between the threads that is capable of holding them in ribbon formation.

I have found that excellent results are secured by causing flocculation of the talc within the coagulant, since this enables the talc to form a coherent coating or film about each individual thread to thereby keep the threads from coming into firm rubber contact with each other. That is the talc film is capable of either entirely preventing a rubber to rubber contact between the threads or of substantially entirely preventing such contact, and such talc upon drying forms a thin cake or layer between the threads which is effective in bonding them together in the desired ribbon formation. I have further found that the desired flocculation of the talc may be produced by introducing into the coagulant a small quantity of any one of a number of fatty agents hereinafter described.

In carrying out the present invention the threads which are to be deposited side by side to form a ribbon are preferably extruded from a group of nozzles positioned close together and conveniently around a common axis to form a cluster or bunch of slightly spaced threads the talc covered surfaces of which touch each other almost immediately after the threads leave the extruding nozzles, and these threads may be brought into the desired ribbon formation at a short distance from the extruding nozzles.

Another important feature of the present invention resides in the method whereby this cluster or bunch of freshly formed threads are assembled into ribbon formation while they are advancing in the coagulant and without becoming tangled or distorted out of shape and are retained in this side by side relation until the wet talc becomes sufficiently dry to bond the threads together.

A further important feature of the present invention resides in a ribbon formed of separable extruded latex threads, which threads are coated with talc and are bonded together wholly or largely by the talc cake.

The above and other features of the invention and novel combination of parts will be more fully understood from the following description when read in connection with the accompanying drawings illustrating one good practical form of apparatus for carrying out the present method and for producing the ribbon herein contemplated.

In the drawings:

Fig. 1 is a longitudinal sectional view through a thread coagulating tank and associated mechanism.

Fig. 2 is a sectional view taken on the line 2—2 of Fig. 1.

Fig. 3 is a top plan view of part of the tank of Fig. 1.

Fig. 4 is a detail view of scraper operating means to be described.

Fig. 5 on an enlarged scale is a top plan view of three multiple-orifice thread-extruding nozzles and means for forming the threads into ribbons.

Fig. 6 is a longitudinal sectional view through part of the tank of Fig. 1 and illustrating only the thread controlling parts.

Fig. 7 on an enlarged scale is a side elevation with parts in section of a multiple orifice nozzle.

Fig. 8 is an end view of the removable multiple-apertured plug shown in Fig. 7.

Fig. 9 is a sectional view taken on the line 9—9 of Fig. 8; and:

Fig. 10 on a greatly enlarged scale is a perspective view of a ribbon formed of separable rubber threads in accordance with the present invention.

In the drawings there is shown a relatively long coagulating tank conveniently formed of sheet metal and having the bottom 10, side walls 11 and end walls 12. This tank is shown as containing a coagulant the surface level of which is indicated by C and the rubber threads are formed by extruding the latex compound into this coagulant. The coagulant with the talc suspended therein is more or less opaque and tends to conceal the mechanism submerged therein, therefore, no attempt has been made to show this liquid except near the surface C.

The latex compound is supplied under the desired head pressure to the manifold 13 positioned above the left-hand end of the coagulating tank and having extending downwardly therefrom a large number of multiple orifice nozzles indicated by N. These nozzles are preferably formed of glass as will be apparent from Fig. 7 and each nozzle has a downwardly inclined portion and a horizontal portion, the latter extends a short distance in the coagulant adjacent to or slightly below the surface level C of the coagulant.

The mechanism so far described is or may be of well known construction except that each nozzle N instead of having a single extruding aperture as heretofore, has a number of extruding apertures as will be apparent from Fig. 8. The number of such apertures may be varied as desired, eight being shown in the drawings to extrude eight latex threads in a bunch or closely grouped condition so that these eight threads may be arranged side by side to form the ribbon R. The purpose of such ribbon as above stated is to greatly increase the capacity of the type of thread drying and vulcanizing machines employed heretofore and in which the threads are vulcanized by placing them on an endless conveyor belt that advances them through a long, heated, drying and vulcanizing chamber.

The coagulant C may be the same as employed heretofore for coagulating latex threads extruded therein, except that as above stated a tack preventing material is introduced directly into the coagulant to prevent the freshly extruded tacky threads from coming into rubber to rubber contact with each other. The most satisfactory tack preventing substance I have found is micronized talc and one good practical type of coagulant that may be used is the following:

*Coagulant*

| | Parts |
|---|---|
| Acetic acid | 50 |
| Water | 50 |
| Talc (micronized) | 10 |
| Oleic acid | 0.15 |

It is found that the talc will not serve entirely satisfactorily to prevent the freshly extruded threads from coming into rubber to rubber contact with each other and to bond these threads together when dry, unless special steps are taken to flocculate the talc to thereby make the particles more or less coherent. This improves the properties of the talc to form a coating about each thread within the coagulant and to later form a talc cake between the threads capable of bonding them in the ribbon formation during the vulcanizing operation.

The latex compound used in forming the threads T may be of the usual mix provided heretofore and containing a vulcanizing agent, except that it is found that the presence of a substantial amount of talc in the coagulant tends, to some extent, to distort the threads from their circular shape and it is therefore desirable to add a stiffening agent to the latex mix. One example of such stiffening agent which is found to work satisfactorily is acetone-diphenol. Another reason why it is important to use a latex mix that will assume a high degree of rigidity or firmness the instant it leaves the extruding nozzles is that when a multiple orifice nozzle is used having the apertures close together as herein contemplated the freshly extruded threads will come into contact with each other almost immediately after they leave the extruding apertures, and unless the threads possess considerable rigidity at this time they will be distorted by the contact of one with another. The latex mix or the materials forming the same should be carefully filtered to prevent clogging the fine apertures of the extruding nozzles.

As soon as the threads T have travelled a short distance from the multiple orifice nozzle N in the form of a group or cluster, it is desirable to bring them into side by side relation to form the ribbon R, but before this takes place the talc suspended in the coagulant should form a coating completely around each thread. The specific gravity of the threads T is less than that of the coagulant C and as a result these threads will rise to the surface of the coagulant a short distance from the extruding nozzles as shown in Figs. 1 and 6 so that the threads may advance along the surface of the coagulant until they reach the ribbon forming roll 14 which is power driven in the direction indicated by the arrow in Fig. 1. This roll is so positioned in the coagulant that its upper curved surface extends upwardly out of the liquid a short distance so that the threads will be lifted out of the coagulant for an instant as they pass over this roll. The purpose of this is to utilize the surface tension which exists between the wet threads when they are not submerged to help pull the threads together in contact with each other as they are drawn lengthwise of the coagulating tank by means to be described. The arrangement is such that the longitudinal pull upon the threads and the surface tension just mentioned together serve to cause the group of threads to arrange themselves in the desired ribbon formation shown in Fig. 10, and wherein it will be noted that each thread T is entirely surrounded by a protecting coating of the talc powder P, which talc upon becoming dry forms a cake or bond B between the threads to hold them in the desired ribbon formation. The bond between the threads T is preferably formed solely by the talc cake B.

The mechanism so far described serves to arrange the threads supplied by each multiple orifice nozzle N into a ribbon R as well shown in Fig. 5, but these threads will not remain in this ribbon formation throughout their travel within the coagulating tank unless special provision is taken to secure this. It is found that one simple and practical means for retaining these threads in the desired side by side relation as they travel lengthwise of the coagulating tank is to provide the thread positioning rods 15, four being shown in Fig. 6 of the drawing as spaced an equal distance from each other between the ribbon forming roll 14 and the thread depressing roll 16. The latter roll is disposed near the right-hand end of the coagulating tank and is driven, by means not shown, at a surface speed somewhat higher than that of the surface speed of the roll 14 to tension and elongate the threads as they travel in the coagulant. Each of the rods 15 it will be noted is provided with a series of arcuate grooves 17. The arrangement is such that the bottom of each groove is disposed slightly above the level of the liquid C. The purpose of this is to cause the arcuate shape of each groove 17 and the surface tension of the wet threads together with the longitudinal tension of the threads to hold all the threads of a group in the desired ribbon formation throughout their travel in the coagulant until they reach the dipping roll 16. The lower surface of this roll it will be noted dips a short distance below the level C of the coagulant to thoroughly wet the threads.

The ribbons R as shown in Figs. 1 and 6 pass upwardly around the roll 16 throughout the greater portion of its circumference and then under the smaller roll 18 and over the two doctor bars 19. By thus passing the ribbons around the major portion of the surface of the roll 16 danger of the ribbon slipping upon the roll is avoided and the roll 18 and bars 19 cooperate with the ribbons to keep them in the desired flat formation and also to wipe the excess liquid therefrom so that it may fall into the tank. The removal of the excess liquid from the threads is important because if the threads are very wet upon leaving the roll 16 the surface tension will tend to force the threads out of the ribbon formation into a bunch or group. The bars just mentioned therefore serve to remove the excess liquid and to help retain the threads in a flat ribbon condition. This result is further secured by causing the threads to pass around the additional power driven rolls 20, 21, and 22 all of which are driven at a sufficiently high surface speed to keep the ribbons taut and stretch them up to approximately 100% as they pass from the ribbon dipping roll 16 to the roll 22. This stretch of the threads draws the surface liquid into the threads and increases the deposit of talc upon the surface of the threads as a coating.

The roll 22 delivers the ribbons R on to the conveyor belt 23 which passes around the roller 24 and upon which belt the ribbons R are placed in slightly spaced relation to each other to be conveyed by this belt through the drying and vulcanizing chamber which may be of usual construction. The spacing of the ribbons R is best shown in Fig. 5 and the proper spacing is maintained as the ribbons approach the conveyor belt 23 by providing one or more combs 25, the teeth of which keep the ribbons properly spaced.

As will be apparent from the table above given the coagulant contains a considerable quantity of fine talc, the specific gravity of which is approximately 2.75 and because of this high specific gravity the talc tends to settle rapidly. Special means therefore have to be provided for keeping the coagulating liquid thoroughly agitated in order to maintain a sufficient amount of talc suspended therein to prevent the threads from sticking together. In addition to keeping the talc well distributed through the coagulant it is highly desirable, as above stated, to secure a flocculation of the talc, and an important feature of the present invention resides in the discovery that such flocculation may be secured by adding to the coagulant a small quantity of any one of a number of fatty agents, oleic acid being considered preferable, but it is also feasible to use stearic acid, cetyl alcohol, fatty acids, fatty alcohols and mineral, animal and vegetable oils. The addition of a small amount of such fatty agent renders the talc particles more coherent to thereby improve the coating which the talc forms about each thread and also improves the bond which this talc forms between the threads when dry.

It is desired to point out that the word "flocculation" has been herein used as applied to an association of the talc particles into groups or clusters resembling a net work in contrast to a complete dispersion wherein such particles are suspended individually. The settling volume of the talc in the coagulant may be used as an indication of the degree of flocculation since an increase in the settling volume indicates an increased flocculation of the particles.

In place of the talc other insoluble powders may be introduced in the coagulant C as a tack reducing agent, such for example as bentonite clay, but since talc is readily flocculated by the simple means above described it is much preferred by me.

In the construction shown, thorough distribution of the talc particles through the coagulant is secured by providing a relatively large circulating pipe 26 which is connected to the floor adjacent the right-hand end of the tank by the coupling 27 and to the floor 10 at the left-hand end of the tank by the coupling 28. This pipe is provided with the pump 29 driven by any suitable means and which serves to force the coagulant lengthwise of the pipe 26 in the direction indicated by the arrow. Within the coagulant tank near the left-hand end thereof there is provided the discharge pipe or manifold 30 extending entirely across the tank and provided with the apertures 31 through which the coagulant is discharged into the tank, and in order to break up the streams of liquid issuing from the apertures 31 the screens 32 and 33 are preferably provided transversely of the tank and against which these streams strike.

The pipe connections just described serve to keep a continuous flow of the coagulant lengthwise of the tank in the direction in which the threads T travel, but it is important that the rate of travel of this liquid lengthwise of the tank be slower than that of the threads so as not to disturb the ribbon formation of these threads. Furthermore, various stirrers and baffles are also needed to prevent settling of the talc and to keep the talc well distributed through the coagulant adjacent the discharge end of the extruding nozzles.

To this end in the construction shown there is provided beneath the nozzles N the shelf 34 which is disposed a short distance below the extruding nozzles and which is so arranged that all of the liquid delivered into the tank by the manifold 30 is required to flow above this shelf adjacent the nozzles in travelling lengthwise of the tank. It is also important to prevent the liquid from flowing laterally of the tank or forming currents that would shift the threads laterally or otherwise disturb the desired ribbon formation. To prevent this a separator blade 35 is provided between each pair of nozzles N as best shown in Fig. 5. These separators are conveniently supported in an upright position between the nozzles by providing the transversely extending notched bars 36 above the shelf 34 and in spaced relation thereto as shown in Fig. 2 and the end of these bars may rest upon the supporting blocks 37 that rest upon the shelf 34 adjacent the sides 11 of the tank.

The mechanism so far described will not entirely prevent the talc from settling upon the shelf 34 and it is therefore desirable to provide the scrapers 38 consisting of relatively long blades secured to a transversely extending bar 39. The scrapers are supported so that they just clear the upper surface of the shelf 34 and extend beneath the notched bars 36. These scrapers are advanced back and forth transversely of the tank as indicated by the arrow shown in Fig. 3 by reciprocating the bar 39 through power means, not shown. The bar 39 may be supported for reciprocatory movement by the bolts 40 which extend through slots 41 formed in the bar. The transverse movement of these scrapers 38 will scrape the talc that has settled in the form of a muck on the shelf 34 into rows which will be carried away by the movement of the coagulant lengthwise of the tank.

It is further necessary to take steps to prevent the talc from settling and accumulating on the floor 10 of the tank and to this end in the construction shown there are provided the agitator rakes comprising the blades 42 which extend substantially entirely across the tank and are actuated by means to be described with a feathering movement and with strokes that overlap so that the blades 42 will scrape the muck which accumulates on the floor 10 lengthwise of the tank towards the sump at the right hand end thereof. This sump is provided between the right-hand end wall 12 of the tank and the upstanding partition 43.

The scraping movement just mentioned is imparted to the blades 42 by mounting in the tank near the floor 10 thereof the reciprocating frames 44 and 45 the latter of which rests upon the former. The blades 42 are pivotally secured to the lower frame 44 at 46 by the supporting brackets 47, and each bracket 47 is provided with an elongated slot adapted to receive a pin 48 which is rigidly secured to the upper sliding frame 45. The arrangement is such that reciprocatory movement is imparted to the lower frame 44 lengthwise of the tank by power actuated means consisting of the revolving pulley 49 driven by the belt 49' and which pulley turns the crank arm 50 rotatably supported at 51 by the bracket shown. This crank arm is connected by a link 52 to a second crank arm 53 which is rockingly supported at 54 upon the supporting structure 55 and which arm serves to rock a third arm 56 the lower end of which is connected by a link 57 to a bracket 58 extending upwardly from the lower frame 44.

While the upper frame 45 rests upon the power reciprocated frame 44 a shorter stroke is imparted to the upper frame than to the lower frame. This is due to the fact that adjustable stops 59 supported from the floor 10 are provided near the opposite ends of the upper frame 45 in its path of movement so as to arrest its travel lengthwise of the tank. The effect of this is to cause the pins 48 to shift the scraper blades 42 so that they will remain in a vertical muck-raking position in which they are shown in Fig. 1 as the rakes are advanced towards the right-hand end of the tank but these rakes will be shifted to the horizontal position in which they are shown in Fig. 4 as they are advanced in the opposite direction, and since the successive strokes of the rakes overlap, they will scrape the settled talc muck lengthwise of the tank towards the above mentioned sump where it can pass through the apertures 60 in the partition 43 to enter the sump 61. The arrangement is such that a large portion of the liquid travelling lengthwise of the tank passes through the apertures 60 to carry the muck into the sump but a portion of the liquid preferably flows over the top of the partition 43 into the sump. The upper end of the pipe coupling 27 is provided with the screen 62 to keep clogging particles from entering this pipe 26.

The multiple orifice nozzle N is shown in Fig. 7 as formed of glass and as having a ground taper bore of reduced diameter near its discharge end to removably receive the correspondingly tapered plug 63 having the extruding apertures 64. The plug 63 is formed of individual glass sleeves that are carefully made and tested for proper extruding properties and are then fused together to form the plug without changing their extruding properties. The plug is then ground to fit removably within the tapered end of the nozzle N.

The term "latex" as employed in this specification and the appended claims designates broadly coagulable dispersions of elastic materials including artificial dispersions of rubber or rubber-like materials as well as natural latex.

It will be seen from the foregoing that by employing the method of the present invention the freshly extruded latex threads T, are disposed side by side in the form of a ribbon while travelling in the coagulant and are prevented from coming into firm rubber to rubber contact with each other by the talc suspended in the coagulant. It will also be seen that this talc as it becomes dry forms a bonding cake between the threads to hold them in the desired ribbon formation during vulcanization. After the ribbons of threads have been vulcanized the threads may be readily separated by breaking the talc cakes B that bond the threads together, and by depositing ribbons R on the conveyor belt 23 instead of spaced individual threads the capacity of this belt is greatly increased.

Having thus described my invention, what I claim and desire to protect by Letters Patent is:

1. A ribbon formed of separable extruded rubber threads bonded together by a dry deposit formed from an aqueous suspension of a flocculated talc that holds the threads out of surface to surface contact with each other except for an occasional non-continuous weak rubber bond between the threads.

2. A ribbon formed of directly deposited latex-rubber threads bonded together by a dry deposit formed from an aqueous suspension of a flocculated talc that holds the threads out of surface to surface contact with each other.

3. A ribbon formed of separable extruded rubber threads that are vulcanized and bonded together by a dry deposit formed from an aqueous suspension of a flocculated talc that holds the threads out of surface to surface contact with each other except for an occasional non-continuous weak rubber bond between the thread.

4. A ribbon formed of separable extruded latex bonded together by a dry deposit formed threads from an aqueous suspension of flocculated talc that holds the threads out of firm surface to surface contact with each other except for an occasional non-continuous weak rubber bond between the threads.

5. A ribbon formed of separable extruded rubber threads each having deposited thereupon a coating formed from a suspension of a flocculated talc and bonded together in the ribbon formation by their respective dry coatings.

6. A ribbon formed of separable extruded latex threads that are vulcanized and each having a coating of an aqueous suspension of a flocculated talc and bonded one to the other in ribbon formation by their respective dry coatings.

7. The method of producing rubber threads, which consists in streaming latex through nozzles into a liquid coagulating medium that contains a tack-reducing flocculated talc to form threads coated with the flocculated talc, bringing the coated wet threads together into ribbon formation and retaining them in this formation until the respective coatings are sufficiently dry to form a cohesive bond that holds the threads together, and then vulcanizing the ribbon whereupon it may be separated into its component threads.

8. The method of producing rubber threads, which consists in streaming latex through a group of nozzles that surround a common point into a liquid coagulating medium that contains a tack-reducing flocculated talc to form threads coated with the flocculated talc, bringing the coated wet threads together into ribbon formation and retaining them in this formation until the respective coatings are sufficiently dry to form a cohesive bond that holds the threads together, and then vulcanizing the ribbon whereupon it may be separated into its component threads.

9. The method of producing rubber threads, which consists in streaming latex through nozzles into a liquid coagulating medium that contains a tack-reducing flocculated talc to form threads coated with the flocculated talc, bringing the coated wet threads together into ribbon formation and retaining them in this formation until the respective coatings are sufficiently dry to form a cohesive bond that holds the threads together, then vulcanizing the ribbon, and thereafter separating the threads.

10. The method of producing rubber threads, which consists in streaming latex through nozzles into a liquid coagulating medium that contains a tack-reducing flocculated talc capable of preventing a surface to surface contact between the extruded threads and which is also capable when dry of forming a bonding cake between the threads, bringing the wet freshly extruded threads together into side by side relation and retaining them in this formation until the talc between them is sufficiently dry to bond the threads in ribbon formation, and vulcanizing the ribbon whereupon it may be separated into its component threads.

11. The method of producing rubber threads less than .02" in diameter which consists in streaming latex through nozzles into a liquid coagulating medium to form separate rubber threads, said medium containing a tack-reducing flocculated talc capable of forming a paste-like bond between the threads, bringing the wet freshly formed threads with a coating of flocculated talk thereupon together into ribbon formation and retaining them in this formation until the paste-like talc is sufficiently dry to bond the threads together, and vulcanizing the ribbon.

12. The method of producing rubber threads which consists in extruding latex through a number of nozzles that are grouped closely around a central point into a liquid coagulating medium, said medium containing a tack-reducing flocculated talc capable of forming a paste-like bond between the threads, bringing these wet freshly formed threads with a coating of flocculated talc thereupon together into ribbon formation and retaining them in this formation until the paste-like talc is sufficiently dry to bond the threads together, and vulcanizing the ribbon.

13. The method of producing rubber threads, which consists in extruding latex through a plurality of nozzles into a liquid coagulating medium to form separate rubber threads, said medium containing a tack-reducing flocculated talc adapted to form a paste-like coating around each thread, bringing the wet freshly formed threads with a coating of flocculated talc thereupon together into ribbon formation and retaining them in this formation until the coating is sufficiently dry to form a rubber-free cohesive bond between the threads, and vulcanizing the ribbon.

14. The method of producing rubber threads, which consists in extruding latex through a group of nozzles into a liquid coagulating medium containing a tack-reducing flocculated talc to form separate rubber threads, bringing the wet freshly formed threads with a coating of flocculated talc thereupon together into ribbon formation by subjecting them to longitudinal tension, surface tension and lateral pressure, and retaining them in this formation until the talc coating is sufficiently dry to form a cohesive bond between the threads to retain them in the ribbon formation.

15. The method of retaining freshly extruded rubber threads side by side in ribbon formation while they are advancing in a liquid bath, which consists in advancing the threads in such ribbon formation over a plurality of supports having concave ribbon supporting surfaces adjacent the surface of the liquid, whereby the curvature of said surfaces and the surface tension of the liquid both act to hold the threads side by side in the form of a ribbon.

ALBERT R. BROSI.